United States Patent
Shen

(10) Patent No.: US 9,380,164 B2
(45) Date of Patent: Jun. 28, 2016

(54) METHOD, NETWORK EXCHANGE DEVICE, AND USER TERMINAL FOR PROVIDING CALL SERVICE

(71) Applicant: Huawei Technologies Co., Ltd., Shenzhen, Guangdong (CN)

(72) Inventor: Bin Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 13/970,263

(22) Filed: Aug. 19, 2013

(65) Prior Publication Data

US 2013/0329877 A1 Dec. 12, 2013

Related U.S. Application Data

(63) Continuation of application No. PCT/CN2011/076718, filed on Jun. 30, 2011.

(51) Int. Cl.
- *H04M 3/42* (2006.01)
- *H04M 3/56* (2006.01)
- *H04M 3/46* (2006.01)
- *H04W 4/16* (2009.01)

(52) U.S. Cl.
CPC ........ *H04M 3/56* (2013.01); *H04M 3/46* (2013.01); *H04W 4/16* (2013.01); *H04M 3/42229* (2013.01); *H04M 3/567* (2013.01)

(58) Field of Classification Search
CPC ... H04M 3/56; H04M 3/567; H04M 2203/5009
USPC .................. 379/202.01, 203.01, 204.01
See application file for complete search history.

(56) References Cited

U.S. PATENT DOCUMENTS

| | | | | |
|---|---|---|---|---|
| 6,792,265 | B1* | 9/2004 | Chan et al. | 455/416 |
| 2002/0009990 | A1* | 1/2002 | Kleier et al. | 455/416 |

(Continued)

FOREIGN PATENT DOCUMENTS

| | | |
|---|---|---|
| CA | 2159249 C | 5/1996 |
| CN | 1893677 A | 1/2007 |

(Continued)

OTHER PUBLICATIONS

International Search Report in corresponding PCT Patent Application No. PCT/CN2011/076718 (Mar. 29, 2012).

*Primary Examiner* — Nafiz E Hoque

(74) *Attorney, Agent, or Firm* — Leydig, Voit & Mayer, Ltd.

(57) ABSTRACT

A method, a network exchange device, and a user terminal for providing a call service are provided by the present disclosure, relating to the field of communication technologies, and invented to increase the communication efficiency of users. The method for providing a call service includes: receiving a call request message from a calling user, where the call request message carries a service operation code and at least two called numbers; determining a connection manner of the call according to the service operation code carried in the call request message; and connecting, according to the determined connection manner, to called users corresponding to the called numbers carried in the call request message. The present disclosure can be applied in the fields of telecommunication and communication.

17 Claims, 4 Drawing Sheets

```
Receive a call request message from a calling user, where the call
request message carries a service operation code and at least two      ─── S11
called numbers Determine a connection manner of the call according to the
service operation code carried in the call request message             ─── S12

Connect, according to the determined connection manner, to
called users corresponding to the called numbers carried in            ─── S13
the call request message
```

(56) References Cited

U.S. PATENT DOCUMENTS

| | | |
|---|---|---|
| 2004/0204119 A1 | 10/2004 | Ho et al. |
| 2006/0104430 A1* | 5/2006 | Kirkland et al. ......... 379/211.04 |
| 2007/0097994 A1* | 5/2007 | Samdadiya et al. .......... 370/401 |
| 2009/0161851 A1 | 6/2009 | Brooks et al. |
| 2013/0216034 A1* | 8/2013 | Mahalingam ............ 379/205.01 |

FOREIGN PATENT DOCUMENTS

| | | |
|---|---|---|
| CN | 101202790 A | 6/2008 |
| CN | 101277342 A | 10/2008 |
| CN | 101521862 A | 9/2009 |
| EP | 0725524 A2 | 8/1996 |
| EP | 1809008 A2 | 7/2007 |

\* cited by examiner

METHOD, NETWORK EXCHANGE DEVICE, AND USER TERMINAL FOR PROVIDING CALL SERVICE

CROSS-REFERENCE TO RELATED APPLICATIONS

This application is a continuation of International Patent Application No. PCT/CN2011/076718, filed on Jun. 30, 2011, which is hereby incorporated by reference in its entirety.

TECHNICAL FIELD

The present disclosure relates to the field of communication technologies, and in particular, to a method, a network exchange device, and a user terminal for providing a call service.

BACKGROUND

Making applications of a communication system more convenient has always been a goal of product manufacturers, service providers, and product users. However, in many cases, especially in enterprise communication, if a user wants to contact multiple other users, the user needs to dial multiple numbers repeatedly to contact the other users, which brings inconvenience to the user.

For example, conventionally, the following scenario may often occur in enterprise communication: Employee A needs to contact employee B or employee C; employee A decides to contact employee B firstly and then contact employee C if failing to reach employee B; employee A dials the fixed phone number of employee B, but the fixed phone gives no reply or is busy; after going on-hook, employee A dials the mobile phone number of employee B; if still failing to reach employee B, employee A begins to dial the phone number of employee C after going on-hook. In this case, employee A needs to perform off-hook, dialing, and on-hook operations multiple times, which makes it inconvenient for employee A to perform communication operations, thereby reducing the communication efficiency and user experience.

SUMMARY

An objective of the present disclosure is to provide a method, a network exchange device, and a user terminal for providing a call service, which can increase the communication efficiency of users.

To achieve the foregoing objective, the present disclosure adopts the following technical solutions:

A method for providing a call service includes:

receiving a call request message from a calling user, where the call request message carries a service operation code and at least two called numbers;

determining a connection manner of the call according to the service operation code carried in the call request message; and connecting, according to the determined connection manner, to called users corresponding to the called numbers carried in the call request message.

A method for providing a call service includes:

sending a call request message to a network exchange device, where the call request message carries a service operation code and at least two called numbers, so that the network exchange device determines a connection manner of the call according to the service operation code carried in the call request message, and connects, according to the determined connection manner, to called users corresponding to the called numbers carried in the call request message.

A network exchange device includes:

a receiving unit, configured to receive a call request message from a calling user, where the call request message carries a service operation code and at least two called numbers;

a determining unit, configured to determine a connection manner of the call according to the service operation code carried in the call request message received by the receiving unit; and a connecting unit, configured to connect, according to the connection manner determined by the determining unit, to called users corresponding to the called numbers carried in the call request message.

A user terminal includes:

a sending unit, configured to send a call request message to a network exchange device, where the call request message carries a service operation code and at least two called numbers, so that the network exchange device determines a connection manner of the call according to the service operation code carried in the call request message, and connects, according to the determined connection manner, to called users corresponding to the called numbers carried in the call request message.

By using the method, the network exchange device, and the user terminal for providing a call service according to embodiments of the present disclosure, a call request message carries a service operation code and at least two called numbers, and a calling user can originate a call to at least two called users by originating a call only once, so that the calling user does not have to perform operations such as off-hook, dialing, and on-hook repeatedly when contacting multiple called users. Therefore, communication operations of the calling user are more convenient and the communication efficiency of the users is increased, thereby improving user experience.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following descriptions show merely some embodiments of the present disclosure, and persons of ordinary skill in the art may still derive other drawings from the accompanying drawings without creative efforts.

DESCRIPTION OF EMBODIMENTS

The following clearly describes the technical solutions in the embodiments of the present disclosure with reference to the accompanying drawings in the embodiments of the present disclosure.

It should be definite that, the described embodiments are merely a part rather than all of the embodiments of the present disclosure. All other embodiments obtained by persons of ordinary skill in the art based on the embodiment of the present disclosure without creative efforts shall fall within the protection scope of the present disclosure.

Figure 1:
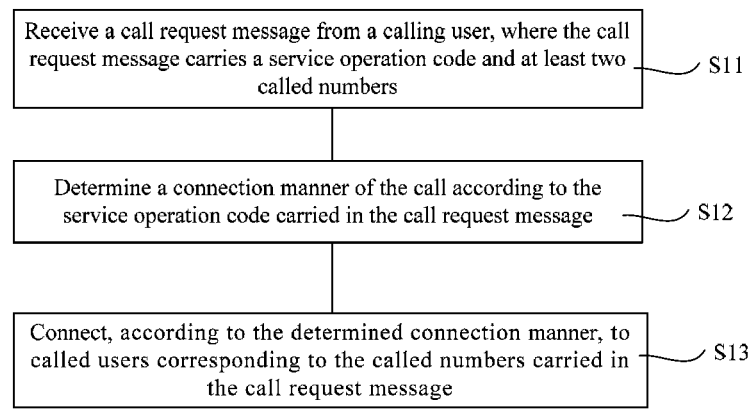
FIG. 1 is a flowchart of a method for providing a call service according to an embodiment of the present disclosure.

As shown in FIG. 1, an embodiment of the present disclosure provides a method for providing a call service. Based on a network exchange device, for example, an Internet Protocol private branch exchange IP PBX (Internet Protocol Private Branch Exchange), the embodiment of the present disclosure includes the following:

S11. Receive a call request message from a calling user, where the call request message carries a service operation code and at least two called numbers.

S12. Determine a connection manner of the call according to the service operation code carried in the call request message.

S13. Connect, according to the determined connection manner, to called users corresponding to the called numbers carried in the call request message.

It is understandable that, in the embodiment of the present disclosure, call service between a calling user and a called user is actually implemented by using a calling terminal corresponding to the calling user and a called terminal used by the called user. Therefore, the called user herein also refers to the called terminal corresponding to the called user, and the calling user also refers to the calling terminal corresponding to the calling user.

By using the method for providing a call service according to the embodiment of the present disclosure, a call request message carries a service operation code and at least two called numbers, and a calling user can originate a call to at least two called users by originating a call only once, which avoids that the calling user performs operations such as off-hook, dialing, and on-hook repeatedly when contacting multiple called users. Therefore, communication operations of the calling user are more convenient and the communication efficiency of users is increased, thereby improving user experience.

The service operation code indicates that a service type of the call is a multi-user call where a call is originated to called users corresponding to the at least two called numbers carried in the call request message, and the network exchange device can determine, according to the service operation code, that the service type of the call is a multi-user call.

Specifically, the service operation code and the called numbers may be manually input by the calling user. The specific form of the service operation code may be a combination of several characters. In the call request message, the service operation code may be set before the called numbers, in the called numbers, or after the called numbers. Preferably, in an embodiment of the present disclosure, the service operation code is set before the called numbers, and in the call request message, the service operation code and the called numbers use the following format: Access Code*TN1*TN2*TN3 . . . #. In the above format, Access Code refers to the service operation code, TN1, TN2, and TN3 refer to the called numbers, * refers to a separator between the service operation code and the called number and between different called numbers, and # refers to an end-of-dialing indicator.

Of course, the specific number of digits, formats, and characters of the service operation code and called numbers in the call request message may be agreed according to the support of the network exchange device, which is not limited by the present disclosure.

The connection manner refers to how the network exchange device connects to the called users corresponding to the at least two called numbers in the call request message. Specifically, the connection manner that may be used by the network exchange device includes: concurrently connecting to the called users corresponding to the at least two called numbers carried in the call request message or connecting, in turn according to a specified sequence, to the called users corresponding to the at least two called numbers carried in the call request message.

The specified sequence may be a sequence of the called numbers carried in the call request message, that is, a sequence of inputting the called numbers by the calling user, or be other sequences, for example, a random sequence, a sequence of connecting to fixed users preferentially or a sequence of connecting to mobile users preferentially, or the like, for example, a sequence of preferentially connecting to a called user corresponding to a fixed phone number in the fixed phone number and a mobile phone number, which is not limited by the present disclosure.

Optionally, the network exchange device may be preset with a connection manner corresponding to each service type. In this case, in step S12, the network exchange device may firstly determine the service type of the call according to the service operation code in the call request message, and then determine the connection manner of the call according to the determined service type and presetting.

It is understandable that, the service operation code may also directly indicate the connection manner of the call in addition to the service type. In this case, in step S12, the network exchange device may determine the connection manner of the call directly according to the service operation code.

For example, assuming that in an embodiment of the present disclosure, a service operation code 78 indicates that the service type is a multi-user call where called users corresponding to at least two called numbers are called, the network exchange device firstly determines, according to the service operation code 78, that the service type is a multi-user call, and then may determine, according to the presetting of the network exchange device, that the connection manner of the call is concurrently connecting to the called users corresponding to the at least two called numbers carried in the call request message or connecting, in turn according to a specified sequence, to the called users corresponding to the at least two called numbers carried in the call request message.

It is assumed that in another embodiment of the present disclosure, the service operation code is 78X, where 78 indicates that the service type is a multi-user call where called users corresponding to at least two called numbers are called and X indicates a connection manner of a multi-user call service type, which may be an integer ranging from 0 to 9. For example, a service operation code 781 indicates the connection manner of concurrently connecting to the called users corresponding to the at least two called numbers carried in the call request message; and a service operation code 782 indicates the connection manner of connecting, in turn according to the sequence of the called numbers carried in the call request message, to the called users corresponding to the at least two called numbers carried in the call request message. In this case, the connection manner of the call can be determined directly according to the service operation code 781 or 782 without the need of determining the connection manner of the call according to the presetting.

Optionally, when the connection manner determined in step S12 is concurrently connecting to the called users corresponding to the at least two called numbers carried in the call request message, step S13 is specifically as follows:

The called users corresponding to the at least two called numbers carried in the call request message are connected concurrently according to the determined connection manner.

In this case, during the connection, the method for providing a call service according to the embodiment of the present disclosure further includes:

if a reply is received from a called user corresponding to one of the called numbers, maintaining, by the network exchange device, a connection to the called user who gives the reply and releasing a connection to a called user other than the called user who gives the reply;

or, if at least one of the called users is busy or faulty, releasing, by the network exchange device, a connection to the at least one of the called users who is busy or faulty;

or, if no reply is received from any one of the called users within a specified time, releasing, by the network exchange device, connections to all the called users.

It should be noted that, in the embodiment of the present disclosure, the specified time refers to a longest call-waiting duration of the network exchange device when no called user gives a reply, and can be set according to the requirement of a user for the call-waiting duration and generally lasts several tens of seconds.

Optionally, when the connection manner determined in step S12 is connecting, in turn according to a specified sequence, to the called users corresponding to the at least two called numbers carried in the call request message, step S13 is specifically as follows:

The called users corresponding to the at least two called numbers carried in the call request message are connected in turn according to the determined connection manner and the specified sequence.

In this case, during the connection, optionally, if no reply is received from a currently connected called user within the specified time, a connection to the currently connected called user is released and a next one of the called users is connected according to the specified sequence.

Optionally, if a currently connected called user is busy or faulty, a connection to the called user who is busy or faulty is released and a next one of the called users is connected according to the specified sequence.

Further, in any connection manner, if the network exchange device releases a connection to a called user corresponding to at least one of the called numbers, the method for providing a call service according to the embodiment of the present disclosure may further include:

sending a connection release notification to the calling user, so that the calling user knows that a call originated to the at least one of the called users already ends.

The connection release notification may indicate a cause of releasing a connection to the at least one of the called users, for example, the at least one of the called users is busy or faulty or gives no reply.

Optionally, the network exchange device may send the connection release notification to the calling user by sending a short message, or may also send the connection release notification to the calling user by originating a call to the calling user and playing an announcement. Of course, other manners may also be used, which is not limited by the present disclosure.

It should be noted that, in the embodiment of the present disclosure, a call protocol between the calling user and the network exchange device may be signaling based on SIP, H.323, H.248, or MGCP, or the like, and a call protocol between the network exchange device and the called user may be broadband signaling based on SIP, H.323, H.248, or MGCP, or the like or be narrowband signaling based No. 7, No. 1, or PRA, or the like, which is not limited by the solution.

It should also be noted that, the called number may be not only an intra-office number but also a number outside the office according to different areas to which the called user corresponding to the connected called number belongs. A called user corresponding to an intra-office called number can be connected directly by originating a call, while a called user corresponding to a called number outside the office can be connected by originating a call to an office of the called user.

For example, if there is a network exchange device in a hotel, the network exchange device forms an office; if a calling user in the hotel originates a call to a called user in the same hotel, the call is a call directly originated to an intra-office called user; if a calling user originates a call to a called user outside the hotel, the call is a call originated to a called user outside the office. In this case, the call can be connected to the called user outside the office by originating a call to an office where the called user outside the office is located. Of course, to differentiate an intra-office call from a call outside the office, the dialing format may be adjusted properly according to specific regulations on dialing operations of the network exchange device, for example, an outgoing office number is added before the called number outside the office, which is not further described herein.

It should be noted that, the number of called numbers carried in the call request message is not limited in the embodiment of the present disclosure, but the maximum number of called numbers carried in the call request message is still limited by a maximum number length supported by the calling terminal and the network exchange device. According to a principle that the total length of the service operation code and the called numbers in the call request message does not exceed the maximum called number length supported by the calling terminal and the network exchange device, if the total length of the service operation code and the called numbers in the call request message exceeds the maximum number length, according to the processing capabilities of the calling terminal and the network exchange device, a call failure is determined or a call connection is performed by deleting numbers exceeding the maximum number length.

Accordingly, an embodiment of the present disclosure further provides a method for providing a call service, which is based on a calling terminal and includes:

sending a call request message to a network exchange device, where the call request message carries a service operation code and at least two called numbers, so that the network exchange device determines a connection manner of the call according to the service operation code carried in the call request message, and connects, according to the determined connection manner, to called users corresponding to the called numbers carried in the call request message.

By using the method for providing a call service according to the embodiment of the present disclosure, a call request message carries a service operation code and at least two called numbers, and a calling user can originate a call to at least two called users by originating a call only once, which avoids that the calling user performs operations such as off-hook, dialing, and on-hook repeatedly when contacting multiple called users. Therefore, communication operations of the calling user are more convenient and the communication efficiency of users is increased, thereby improving user experience.

The service operation code indicates that a service type of the call is a multi-user call where a call is originated to called users corresponding to the at least two called numbers carried in the call request message, and the network exchange device can determine, according to the service operation code, that the service type of the call is a multi-user call.

The connection manner refers to how the network exchange device connects to the called users corresponding to the at least two called numbers in the call request message.

The network exchange device may be preset with a connection manner corresponding to each service type, so that the network exchange device may firstly determine the service type of the call according to the service operation code in the call request message, and then determine the connection manner of the call according to the determined service type and presetting.

Optionally, the service operation code may also directly indicate the connection manner of the call in addition to the service type.

Specifically, the service operation code and the called numbers may be manually input by the calling user. The specific form of the service operation code may be a combination of several characters. In the call request message, the service operation code may be set before the called numbers, in the called numbers, or after the called numbers. Preferably, in an embodiment of the present disclosure, the service operation code is set before the called numbers, and in the call request message, the service operation code and the called numbers use the following format: Access Code*TN1*TN2*TN3 . . . #. In the above format, Access Code refers to the service operation code, TN1, TN2, and TN3 refer to the called numbers, * refers to a separator between the service operation code and the called number and between different called numbers, and # refers to an end-of-dialing indicator.

Of course, the specific number of digits, formats, and characters of the service operation code and called numbers in the call request message may be agreed according to the support of the network exchange device, which is not limited by the present disclosure.

The following describes in detail a method for providing a call service according to an embodiment of the present disclosure.

Figure 2:
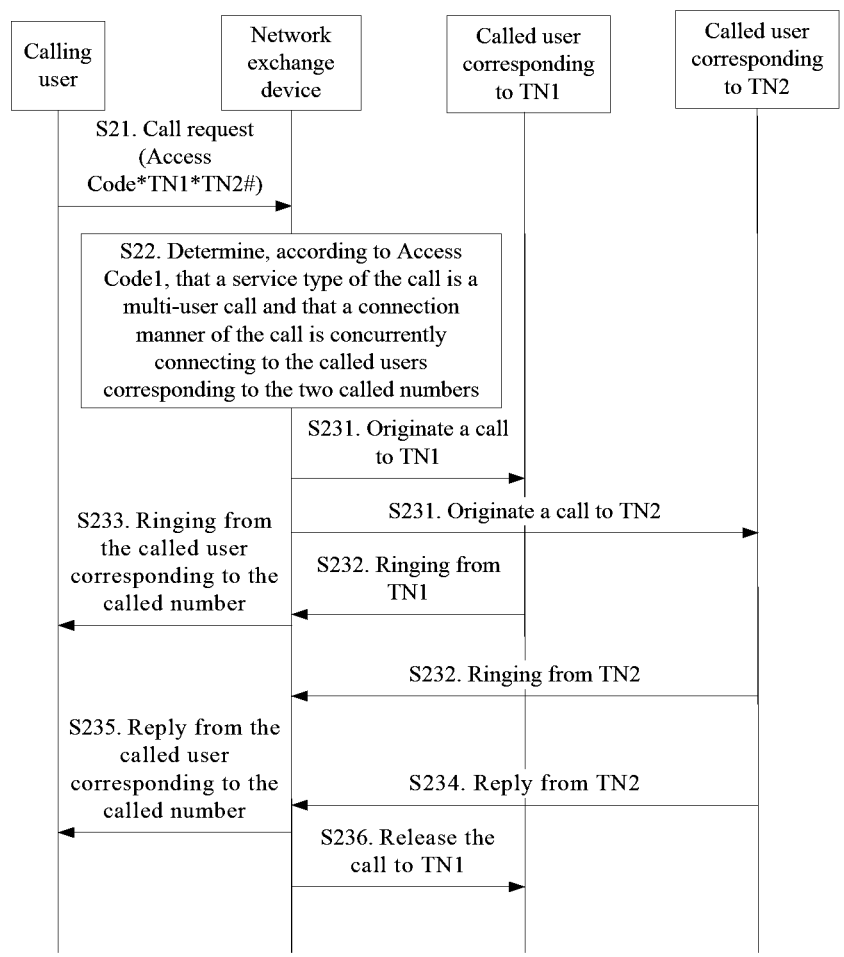
FIG. 2 is another flowchart of a method for providing a call service according to an embodiment of the present disclosure.

In this embodiment, a calling user needs to call two called users whose called numbers are TN1 and TN2 respectively. After the calling user sends a call request message, as shown in FIG. 2, a network exchange device performs the following processing:

S21. Receive the call request message from the calling user.

In this step, the call request message includes Access Code1*TN1*TN2#, where Access Code1 refers to a service operation code and indicates that a service type of the call is a multi-user call and that a connection manner of the call is concurrently connecting to the called users corresponding to the two called numbers.

S22. Determine, according to a service operation code Access Code1 carried in the call request message, that a service type of the call is a multi-user call and that a connection manner of the call is concurrently connecting to the called users corresponding to the two called numbers.

S23. Concurrently connect, according to the connection manner determined in step S22, to the called users corresponding to TN1 and TN2, which specifically includes the following:

S231. Concurrently originate a call to the called users corresponding to TN1 and TN2.

S232. Receive a ringing message from the called users corresponding to TN1 and TN2.

Meanwhile, the network exchange device starts a no-reply timer with respect to the called users corresponding to TN1 and TN2, where the no-reply timer is configured to set a longest call-waiting duration (that is, a specified time) of the network exchange device when no called user gives a reply. The waiting duration may be the same as a waiting duration of an ordinary call in the prior art, and a needed waiting duration may also be set according to user requirements, which is not limited by the present disclosure. If no called user gives a reply before the timing of the no-reply timer expires, the network exchange device releases connections to the called users.

S233. Send a ringing message of a called user corresponding to TN1 or TN2 to the calling user.

The ringing message indicates that the called user corresponding to TN1 or TN2 is ringing. It should be noted that, in this embodiment, though the called users corresponding to TN1 and TN2 may be ringing, only one ringing message is sent to the calling user, and the ringing message indicates that a called user is ringing but does not specifically indicate which called user is ringing or which called users are ringing.

S234. Receive a reply message from a called user corresponding to TN2.

In this embodiment, the called user corresponding to TN2 firstly gives a reply to the call.

S235. Send the reply message of the called user corresponding to TN2 to the calling user, so that the calling user communicates with the called user corresponding to TN2.

S236. Release the call originated to the called user corresponding to TN1.

It should be noted that, in this embodiment, step S235 and step S236 can be performed in any sequence so long as the calling user and the called user corresponding to TN2 can perform a normal conversation.

In this embodiment, the called user corresponding to TN2 gives a reply to the call of the calling user, but in another embodiment of the present disclosure, when neither of the called users corresponding to TN1 and TN2 gives a reply, after step S233, the method for providing a call service according to the embodiment of the present disclosure further includes:

when detecting that the no-reply timer expires, releasing the connections to the called users corresponding to TN1 and TN2; and optionally, at the same time, sending a connection release notification to the calling user by originating a call to the calling user or sending a short message.

In another embodiment of the present disclosure, after the network exchange device concurrently originates a call to the called users corresponding to TN1 and TN2, if at least one of the called users corresponding to TN1 and TN2 is in a busy or faulty state, after step S231, this embodiment further includes:

receiving a message indicating that the called user corresponding to TN1 or TN2 is busy or faulty; and releasing a connection to the called user corresponding to TN1 or TN2 that is faulty; and optionally, at the same time, sending a connection release notification to the calling user by originating a call to the calling user or sending a short message.

Figure 3:
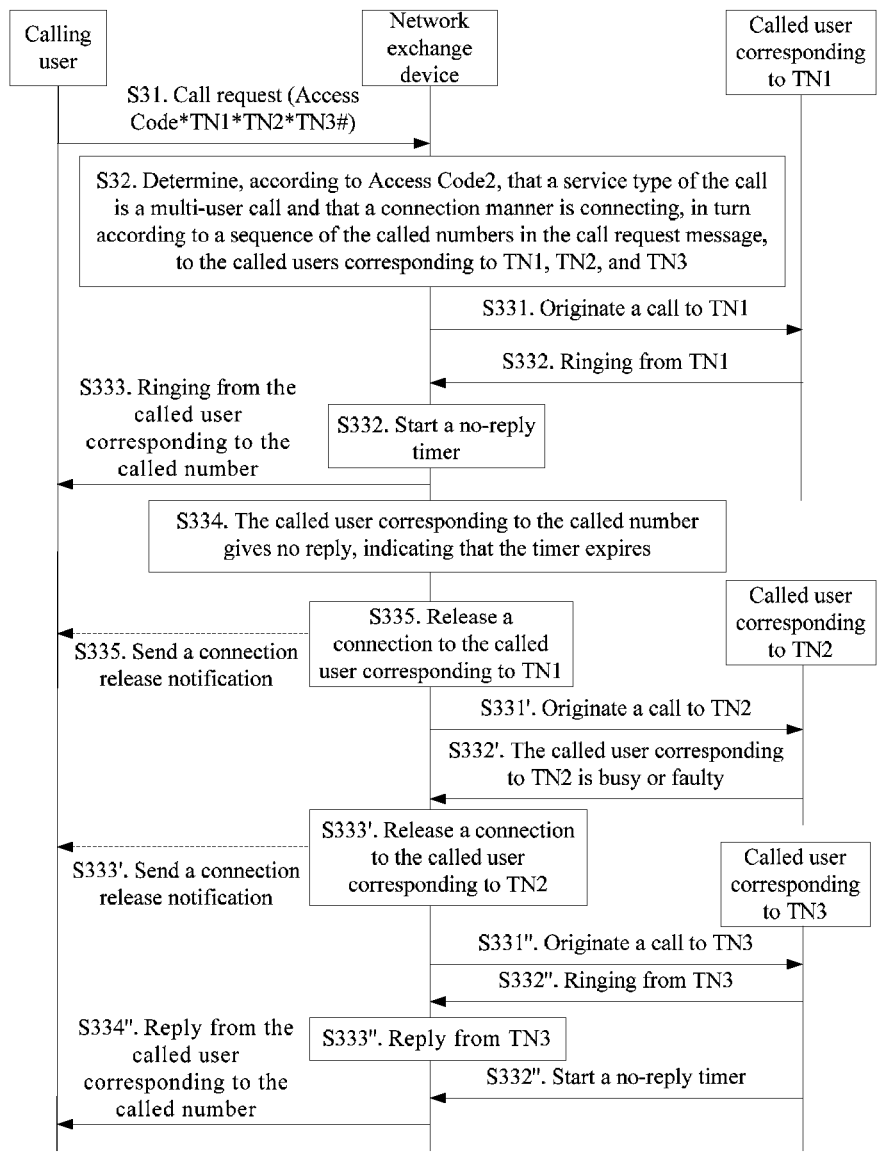
FIG. 3 is another flowchart of a method for providing a call service according to an embodiment of the present disclosure.

FIG. 3 shows another specific embodiment of a method for providing a call service according to an embodiment of the present disclosure. In this embodiment, a calling user needs to call three called users whose called numbers are TN1, TN2, and TN3 respectively. After the calling user sends a call request message, as shown in FIG. 3, a network exchange device performs the following processing:

S31. Receive the call request message from the calling user.

The call request message includes Access Code2*TN1*TN2*TN3#, where Access Code2 refers to a service operation code and indicates that a service type of the call is a multi-user call and that a connection manner of the call is connecting, in turn according to a specified sequence, to the called users corresponding to the three called numbers.

In this embodiment, it is assumed that the specified sequence is a sequence of the called numbers in the call request message. Of course, the specified sequence may also be other specified sequences.

S32. Determine, according to a service operation code Access Code2 carried in the call request message, that a service type of the call is a multi-user call and that a connection manner is connecting, in turn according to the sequence of the called numbers in the call request message, to the called users corresponding to TN1, TN2, and TN3.

S33. Connect, in turn according to the connection manner determined in step S32, to the called users corresponding to TN1, TN2, and TN3, which specifically includes the following:

S331. Originate a call to a called user corresponding to TN1.

S332. Receive a ringing message from the called user corresponding to TN1, and start a no-reply timer.

The no-reply timer is configured to set a longest call-waiting duration (that is, a specified time) of the network exchange device when no called user gives a reply. The waiting duration may be the same as a waiting duration of an ordinary call in the prior art, and a needed waiting duration may also be set according to user requirements, which is not limited by the present disclosure. If no called user gives a reply before the timing of the no-reply timer expires, the network exchange device releases connections to the called users.

S333. Send a ringing message to the calling user to indicate that the called user corresponding to TN1 is idle and ringing.

S334. Detect that the no-reply timer expires.

S335. Release a connection to the called user corresponding to TN1.

Optionally, after the connection to the called user corresponding to TN1 is released, the method for providing a call service according to this embodiment further includes sending a connection release notification to the calling user by sending a short message to notify the calling user that the called user corresponding to TN1 gives no reply.

In this embodiment, because the called user corresponding to TN1 gives no reply, a first call of calls originated to the called users corresponding to the three called numbers in turn fails. In this case, the network exchange device automatically connects the calling user to a called user corresponding to a next called number in the call request message. In this embodiment, a next called number of TN1 is TN2.

Next, the method for providing a call service according to the embodiment of the present disclosure further includes the following:

S331'. Originate a call to a called user corresponding to TN2.

S332'. Receive a message indicating that the called user corresponding to TN2 is busy or faulty.

S333'. Release a connection to the called user corresponding to TN2.

After the connection to the called user corresponding to TN2 is released, optionally, a connection release notification is sent to the calling user by sending a short message.

In the call originated to the called user corresponding to TN2, TN2 is in a busy or faulty state and therefore, cannot normally communicate with the calling user. In this case, the network exchange device automatically connects the calling user to a called user corresponding to a next called number in the call request message. In this step, a next called number of TN2 is TN3.

Next, the method for providing a call service according to the embodiment of the present disclosure further includes the following:

S331". Originate a call to a called user corresponding to TN3.

S332". Receive a ringing message from the called user corresponding to TN3, and start a no-reply timer.

S333". Receive a reply message from the called user corresponding to TN3.

S334". Send the reply message of the called user corresponding to TN3 to the calling user, so that the calling user communicates with the called user corresponding to TN3.

It should be noted that, in this embodiment, a call is firstly originated to the called user corresponding to TN1, and the connection fails because the called user corresponding to TN1 does not give an immediate reply; then, a call is originated to the called user corresponding to TN2, and the connection also fails because the called user corresponding to TN2 is in the busy or faulty state; and finally, a call is originated to TN3, and the connection succeeds because the called user corresponding to TN3 gives an immediate reply. The above process involves three cases encountered when the called users corresponding to the called numbers are connected. To clearly describe the method for providing a call service according to the embodiment of the present disclosure, each of the three cases is listed in this embodiment. However, in other embodiments of the present disclosure, whether calls are originated to the called users corresponding to the called numbers TN1, TN2, and TN3 in this embodiment and the sequence of the calls are not limited by the present disclosure. For example, in another embodiment of the present disclosure, if a called user corresponding to a first called number gives a reply, a call does not need to be originated to called users corresponding to other called numbers in a call request message. That is to say, in the embodiment of the present disclosure, a call can be originated, in turn according to a specified sequence, to the called users corresponding to at least two called numbers in the call request message until a called user corresponding to one of the called numbers is connected or called users corresponding to all the called numbers in the call request message are called at least once.

By using the method for providing a call service according to the embodiment of the present disclosure, a call request message carries a service operation code and at least two called numbers, and a calling user can originate a call to called users corresponding to at least two called numbers by originating a call only once, which avoids that the calling user performs operations such as off-hook, dialing, and on-hook repeatedly when contacting multiple called users. Therefore, communication operations of the calling user are more convenient and the communication efficiency of users is increased.

Figure 4:
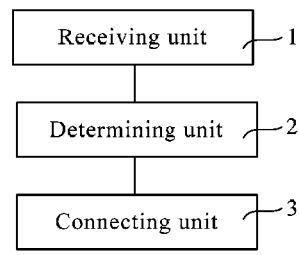
FIG. 4 is a structural block diagram of a network exchange device according to an embodiment of the present disclosure.

Corresponding to the foregoing method for providing a call service, as shown in FIG. 4, an embodiment of the present disclosure also provides a network exchange device, including:

a receiving unit 1, configured to receive a call request message from a calling user, where the call request message carries a service operation code and at least two called numbers;

a determining unit 2, configured to determine a connection manner of the call according to the service operation code carried in the call request message received by the receiving unit 1; and a connecting unit 3, configured to connect, according to the connection manner determined by the determining unit 2, to called users corresponding to the called numbers carried in the call request message.

By using the network exchange device according to the embodiment of the present disclosure, a call request message carries a service operation code and at least two called numbers, and a calling user can originate a call to called users corresponding to at least two called numbers by originating a call only once, which avoids that the calling user performs operations such as off-hook, dialing, and on-hook repeatedly when contacting multiple called users. Therefore, communication operations of the calling user are more convenient and the communication efficiency of users is increased.

The determining unit 2 may be specifically configured to:

determine a service type of the call according to the service operation code carried in the call request message; and determine the connection manner of the call according to the determined service type and presetting.

The connection manner determined by the determining unit 2 may specifically include:

concurrently connecting to the called users corresponding to the at least two called numbers carried in the call request message; or connecting, in turn according to a specified sequence, to the called users corresponding to the at least two called numbers carried in the call request message.

Specifically, when the connection manner determined by the determining unit 2 is concurrently connecting to the called users corresponding to the at least two called numbers carried in the call request message, the connecting unit 3 is specifically configured to:

concurrently connect, according to the connection manner determined by the determining unit 2, to the called users corresponding to the at least two called numbers carried in the call request message.

In this case, further, during the connection, the connecting unit 3 is further configured to:

if a reply is received from a called user corresponding to one of the called numbers, maintain a connection to the called user who gives the reply and release a connection to a called user other than the called user who gives the reply;

or, if at least one of the called users is busy or faulty, release a connection to the at least one of the called users who is busy or faulty.

Optionally, if no reply is received from any one of the called users within a specified time, the connecting unit 3 is further configured to release connections to all the called users.

Specifically, when the connection manner determined by the determining unit 2 is connecting, in turn according to a specified sequence, to the called users corresponding to the at least two called numbers carried in the call request message, the connecting unit 3 is specifically configured to:

connect, in turn according to the specified sequence by using the connection manner determined by the determining unit 2, to the called users corresponding to the at least two called numbers carried in the call request message.

In this case, further, during the connection, the connecting unit 3 is further configured to:

if no reply is received from a currently connected called user within a specified time, release a connection to the currently connected called user and connect to a next one of the called users according to the specified sequence; or if a currently connected called user is busy or faulty, further configured to release a connection to the called user who is busy or faulty and connect to a next one of the called users according to the specified sequence.

Figure 5:
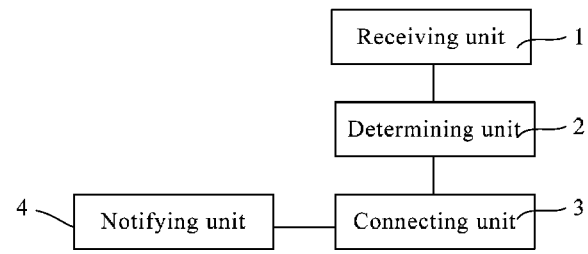
FIG. 5 is another structural block diagram of a network exchange device according to an embodiment of the present disclosure.

Further, as shown in FIG. 5, in an embodiment of the present disclosure, the network exchange device further includes a notifying unit 4, configured to send a connection release notification to the calling user when the connecting unit 3 releases a connection to a called user corresponding to at least one of the called numbers.

The notifying unit 4 is specifically configured to: send the connection release notification to the calling user by sending a short message; or send the connection release notification to the calling user by originating a call to the calling user and playing an announcement.

Accordingly, an embodiment of the present disclosure further provides a user terminal, including:

a sending unit, configured to send a call request message to a network exchange device, where the call request message carries a service operation code and at least two called numbers, so that the network exchange device determines a connection manner of the call according to the service operation code carried in the call request message, and connects, according to the determined connection manner, to called users corresponding to the called numbers carried in the call request message.

By using the user terminal according to the embodiment of the present disclosure, a call request message carries a service operation code and at least two called numbers, and a calling user can originate a call to called users corresponding to at least two called numbers by originating a call only once, which avoids that the calling user performs operations such as off-hook, dialing, and on-hook, repeatedly when contacting multiple called users. Therefore, communication operations of the calling user are more convenient and the communication efficiency of users is increased.

For details about the service operation code, refer to the foregoing detailed descriptions of the service operation code, which is not further described herein.

Specifically, the user terminal provided in the embodiment of the present disclosure may be terminals such as a mobile phone, a fixed phone, an IP phone, and a soft phone.

In addition, the network exchange device in the foregoing embodiment of the present disclosure may be various network exchanges. The network exchange device includes a processor, and the method for providing a call service in the embodiments may be specifically performed by the processor of the network exchange device. The modules in the network exchange device in the foregoing embodiments may be modules in the processor. The calling/called user terminal in the foregoing embodiments of the present disclosure may be a mobile terminal, for example, a mobile phone, a PDA, and other personal handheld devices, or be a notebook computer capable of implementing call connections, or be a fixed terminal, for example, a fixed phone, or be a computer capable of implementing call connections, which is not limited by the present disclosure.

Persons of ordinary skill in the art may understand that, all or a part of the processes of the methods in the embodiments may be implemented by a computer program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, or an optical disk.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for providing a call service, implemented by a processor of a private branch exchange (PBX), the method comprising:
   receiving by the PBX a call request message from a calling user's device, wherein the call request message carries a service operation code and at least two called numbers;
   determining by the PBX, a connection manner of a call according to the service operation code carried in the call request message; and
   connecting by the PBX, according to the determined connection manner, to called user devices corresponding to the at least two called numbers carried in the call request message.

2. The method according to claim 1, wherein the determining the connection manner of the call according to the service operation code carried in the call request message comprises:
   determining by the PBX a service type of the call according to the service operation code carried in the call request message; and
   determining by the PBX the connection manner of the call according to at least one of (a) the determined service type and (b) presetting of the PBX.

3. The method according to claim 1, wherein the connection manner comprises:
   concurrently connecting by the PBX to the called user devices corresponding to the at least two called numbers carried in the call request message.

4. The method according to claim 1, wherein the connection manner comprises:
   connecting, by the PBX, in turn according to a specified sequence, to the called user devices corresponding to the at least two called numbers carried in the call request message.

5. The method according to claim 3, wherein:
   the connection manner comprises concurrently connecting to the called user devices corresponding to the at least two called numbers carried in the call request message; and
   the method further comprises one of the group consisting of:
   if a reply is received from one of the called user devices corresponding to one of the at least two called numbers, maintaining, by the PBX, a connection to the called user device that sends the reply and releasing a connection to another called user device other than the called user device that sends the reply;
   if at least one of the called user devices is busy or faulty, releasing, by the PBX, a connection to the at least one of the called user devices that is busy or faulty; and
   if no reply is received from any one of the called user devices within a specified time, releasing, by the PBX, connections to all the called user devices.

6. The method according to claim 4, wherein:
   the connection manner is connecting, in turn according to a specified sequence, to the called user devices corresponding to the at least two called numbers carried in the call request message; and
   the method further comprises one of the group consisting of:
   if no reply is received from a currently connected called user device within a specified time, releasing, by the PBX, a connection to the currently connected called user device and connecting to a next one of the called user devices according to the specified sequence; and
   if the currently connected called user device is busy or faulty, releasing, by the PBX, a connection to the currently connected called user device and connecting to the next one of the called user devices according to the specified sequence.

7. The method according to claim 5, further comprising:
   when releasing the connection to the called user device corresponding to at least one of the called numbers, implementing one of the group consisting of:
   sending, by the PBX, a connection release notification to the calling user's device by sending a short message; and
   sending, by the PBX, the connection release notification to the calling user's device by originating a call to the calling user's device and playing an announcement.

8. The method according to claim 6, further comprising:
   when releasing the connection to the called user device corresponding to at least one of the called numbers, implementing one of the group consisting of:
   sending, by the PBX, a connection release notification to the calling user's device by sending a short message; and
   sending, by the PBX, the connection release notification to the calling user's device by originating a call to the calling user's device and playing an announcement.

9. A method for providing a call service, implemented by a processor of a user equipment, the method comprising:
   sending by the user equipment, a call request message to a private branch exchange (PBX);
   wherein the call request message carries a service operation code and at least two called numbers, and
   wherein the PBX determines a connection manner of a call according to the service operation code carried in the call request message, and connects, according to the determined connection manner, to called user devices corresponding to the at least two called numbers carried in the call request message.

10. A private branch exchange (PBX), comprising:
    a processor and a memory which is coupled to the processor,
    wherein the processor is configured to:
    receive a call request message from a calling user's device, wherein the call request message carries a service operation code and at least two called numbers;
    determine a connection manner of a call according to the service operation code carried in the call request message; and
    connect, according to the determined connection manner, to called user devices corresponding to the at least two called numbers carried in the call request message.

11. The PBX according to claim 10, wherein the processor is configured to:
    determine a service type of the call according to the service operation code carried in the call request message; and
    determine the connection manner of the call according to the determined service type and presetting of the PBX.

12. The PBX according to claim 10, wherein the determined connection manner comprises:
concurrently connecting to the called user devices corresponding to the at least two called numbers carried in the call request message.

13. The PBX according to claim 10, wherein the determined connection manner comprises:
connecting, in turn according to a specified sequence, to the called user devices corresponding to the at least two called numbers carried in the call request message.

14. The PBX according to claim 12, wherein:
the determined connection manner comprises concurrently connecting to the called user devices corresponding to the at least two called numbers carried in the call request message; and
the processor is further configured to implement one of the group consisting of:
if a reply is received from one of the called user devices corresponding to one of the at least two called numbers, maintaining a connection to the called user device that sends the reply and releasing a connection to another called user device other than the called user device that sends the reply;
if at least one of the called user devices is busy or faulty, releasing a connection to the at least one of the called user devices that is busy or faulty; and
if no reply is received from any one of the called user devices within a specified time, releasing connections to all the called user devices.

15. The PBX according to claim 13, wherein:
the determined connection manner comprises connecting, in turn according to a specified sequence, to the called user devices corresponding to the at least two called numbers carried in the call request message; and
the processor is further configured to implement one of the group consisting of:
if no reply is received from a currently connected called user device within a specified time, releasing a connection to the currently connected called user device and connect to a next one of the called user devices according to the specified sequence; and
if the currently connected called user device is busy or faulty, releasing a connection to the called user device that is busy or faulty and connect to the next one of the called user devices according to the specified sequence.

16. The PBX according to claim 14, wherein:
when a connection to a called user device corresponding to at least one of the called numbers is released, processor is configured to implement one of the group consisting of:
sending a connection release notification to the calling user's device by sending a short message; and
sending the connection release notification to the calling user's device by originating a call to the calling user's device and playing an announcement.

17. The PBX according to claim 15, wherein:
when a connection to a called user device corresponding to at least one of the called numbers is released, the processor is configured to implement one of the group consisting of:
sending a connection release notification to the calling user's device by sending a short message; and
sending the connection release notification to the calling user's device by originating a call to the calling user's device and playing an announcement.

\* \* \* \* \*